US006545590B1

(12) United States Patent
Katayama

(10) Patent No.: US 6,545,590 B1
(45) **Date of Patent: *Apr. 8, 2003**

(54) MUSICAL ALERT RADIO PAGER

(75) Inventor: Hideyuki Katayama, Shizuoka (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 713 days.

(21) Appl. No.: 08/687,039

(22) Filed: Jul. 25, 1996

(30) Foreign Application Priority Data

Jul. 26, 1995 (JP) ........................................... 7-190325

(51) Int. Cl.[7] ............................................ H04Q 1/00
(52) U.S. Cl. ............................................... 340/7.62
(58) Field of Search ...................... 340/825.44, 825.48, 340/7.62; 455/38.1

(56) References Cited

U.S. PATENT DOCUMENTS 4,468,813 A * 8/1984 Burke ...................... 455/38.1
4,713,808 A * 12/1987 Gaskill .................. 340/825.44
4,873,520 A * 10/1989 Fisch .................... 340/825.44
4,885,577 A 12/1989 Nelson .................. 340/825.44
5,332,994 A * 7/1994 Kawashima ........... 340/825.44
5,394,140 A * 2/1995 Wong .................... 340/825.44
5,412,719 A 5/1995 Hamamoto et al.

FOREIGN PATENT DOCUMENTS

JP 64 29933 2/1989
WO WO9606417 2/1996

OTHER PUBLICATIONS

Data Communications, Networks, and Systems. Tomas C Bartee (editor) SAMS Publishing, 1992.*
Patent Abstracts of Japan, vol. 95, No. 12, Dec. 26, 1995.
Patent Abstracts of Japan, vol. 18, No. 195, Apr. 5, 1994.

* cited by examiner

*Primary Examiner*—Brian Zimmerman
(74) *Attorney, Agent, or Firm*—Sughrue Mion, PLLC

(57) ABSTRACT

A radio pager receives from a base station a paging signal consisting of an address code group and a message code group including musical note data. The receiver separates the received paging signal into the address code group and message code group. Further, the receiver separates the message code group into message data and musical note data by using a melody start symbol and a melody end symbol. Then, the receiver generates melody frequencies corresponding to the consecutive musical note data, modulates the melody frequencies to output a melody, and drives a speaker therewith.

14 Claims, 8 Drawing Sheets

Fig. 3

| MUSICAL NOTE DATA | MELODY FREQUENCY | MUSICAL NOTE |
|---|---|---|
| < | | MELODY START SYMBOL |
| 0 | 1037.8kHz | DO |
| 1 | 1163.6kHz | RE |
| 2 | 1280.0kHz | MI |
| 3 | 1371.4kHz | FA |
| 4 | 1536.0kHz | SO |
| 5 | 1745.4kHz | LA |
| 6 | 1920.0kHz | TI |
| 7 | 2077.0kHz | DO |
| 8 | | |
| 9 | | |
| > | | MELODY END SYMBOL |

MUSICAL ALERT RADIO PAGER

BACKGROUND OF THE INVENTION

The present invention relates to an improved radio pager and, more particularly, to a radio pager capable of generating alert tones corresponding to musical note information included in a paging signal which the receiver receives from a base station.

It has been customary with a radio pager to receive a paging signal consisting of an address code group and a message code group sent from a base station. The pager compares the received address code group with an address code assigned to the pager. If the former coincides with the latter, the pager alerts the user of the receipt by outputting sound or vibration in a single pattern stored in the pager beforehand.

The radio pager may store a plurality of different patterns of sound and vibration beforehand. For this kind of pager, the base station adds a particular code designating desired one of the patterns to the address code group and then sends it to the pager. In response, the pager selects the pattern designated by the particular code and then drives a speaker or a buzzer.

Further, the radio pager may store a plurality of fixed sentences beforehand, as taught in Japanese Utility Model Laid-Open Publication No. 1-029933. In such a case, the base station adds a particular code designating desired one of the fixed sentences to the address code group and then sends it to the pager. In response, the pager selects the fixed sentence designated by the particular code, synthesizes a speech, and then drives a speaker.

The conventional radio pagers with the above various schemes have some problems yet to be solved, as follows. Because the sound and vibration patterns or the fixed sentences must be stored in a memory beforehand, the number thereof is limited by the capacity of a memory available with the pager. Moreover, a number of sound and vibration patterns or fixed sentences cannot be stored without resorting to a large capacity memory, resulting in an increase in production cost. In addition, the sound and vibration patterns and the fixed sentences are not open to choice.

SUMMARY OF THE INVENTION

It is therefore an object of the present invention to provide a radio pager capable of receiving from a base station a paging signal consisting of an address code group and a message code group including a musical note code group, combining frequencies corresponding to the note code group, and modulating the frequencies to output a melody, and thereby producing alert tones.

In accordance with the present invention, in a radio pager for receiving from a base station a paging signal consisting of an address code group and a message code group including message data and musical note data, and displaying, when an address code of the address code group is coincident with an address code assigned to the radio pager, a message on an LCD (Liquid Crystal Display) while causing a speaker to sound, a controller separates the paging signal into the address code group and the message code group, and separates the message code group into the message data and the musical note data. A melody generating section generates a melody corresponding to the musical note data separated by the control means.

BRIEF DESCRIPTION OF THE DRAWINGS

The above and other objects, features and advantages of the present invention will become apparent from the following detailed description taken with the accompanying drawings in which:

FIG. 3 shows a specific message conversion table included in the embodiment;

DESCRIPTION OF THE PREFERRED EMBODIMENT

Figure 1:
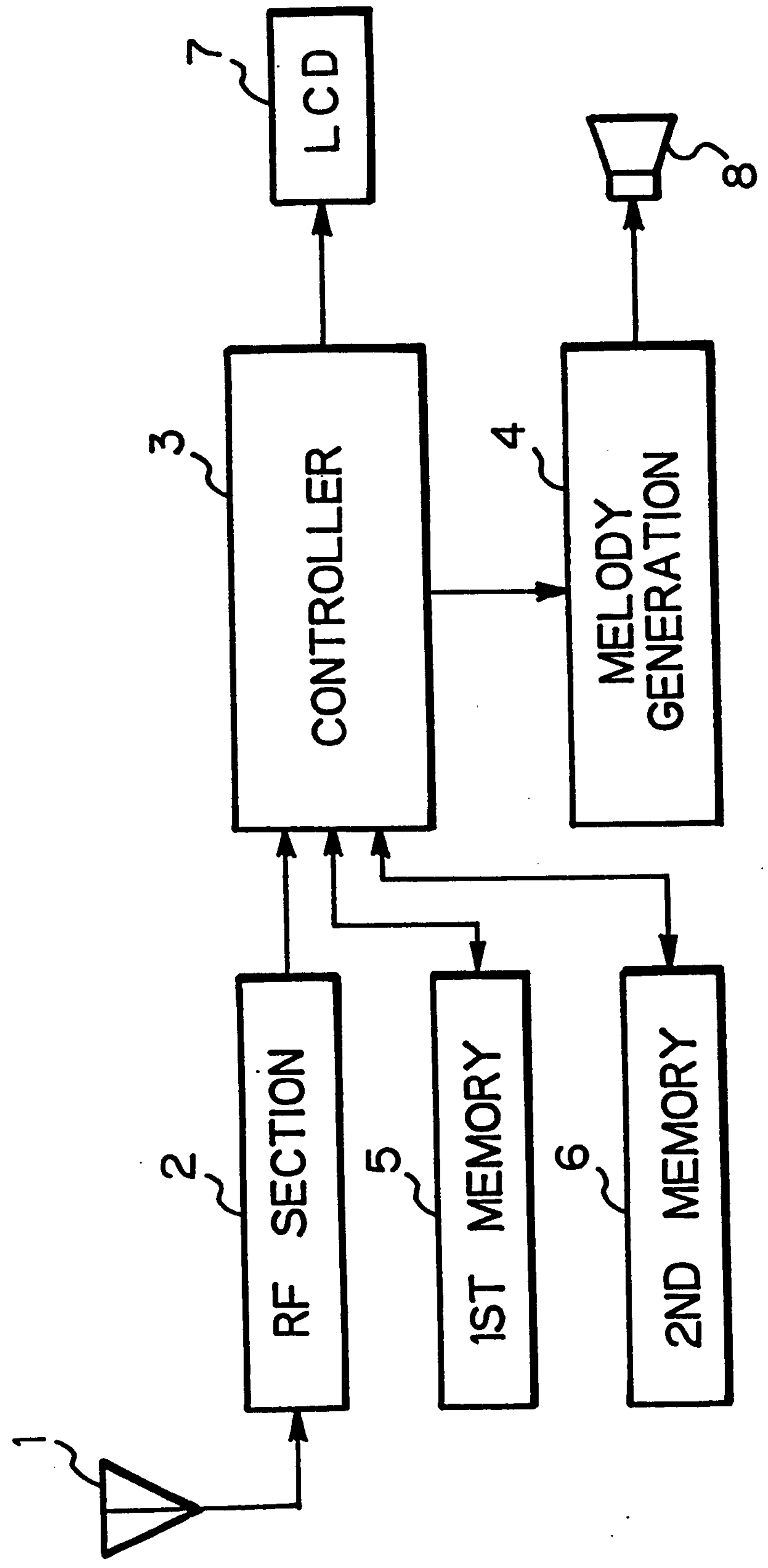
FIG. 1 is a block diagram schematically showing a radio pager embodying the present invention.

Referring to FIG. 1 of the drawings, a radio pager embodying the present invention is shown. As shown, the radio pager has a radio section or RF (Radio Frequency) section 2 connected to an antenna 1. A paging signal sent from a base station and consisting of an address code group and a message code group comes in through the antenna 1. The paging signal is routed through the RF section 2 to a controller 3. The controller separates the paging signal into the address code group and message code group, and compares the address code group with an address code assigned to the pager. If the received address code group and assigned address code compare equal, the controller 3 accepts the message code group following the address code group. The controller 3 separates musical note data from the message code group, and then controls the generation of alert tones corresponding to the note data and the display of message data included in the message code group. A first memory 5 temporarily stores the message code group separated from the paging signal. A second memory 6 stores the address code assigned to the pager and a single fixed alert tone pattern beforehand. A melody generation 4 receives the musical note data from the controller 3, generates melody frequencies corresponding to the note data, and outputs alert tones in the form of a melody. An LCD (Liquid Crystal Display) 7 is used to display a message. The alert tones generated by the melody generation 4 are output via a speaker 8.

Figure 2A:
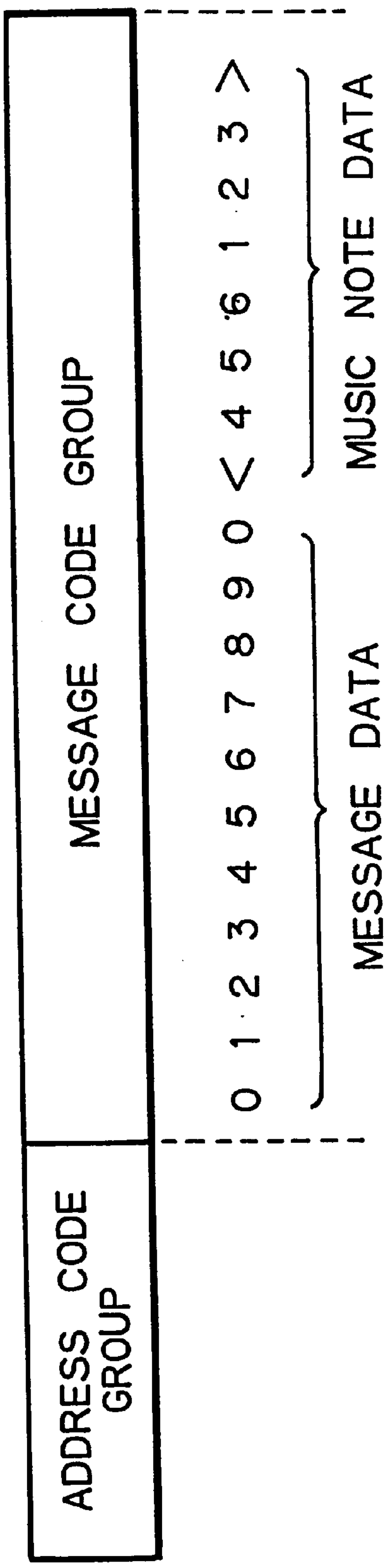
FIG. 2A shows the format of a paging signal applicable to the embodiment.
Figure 2B:
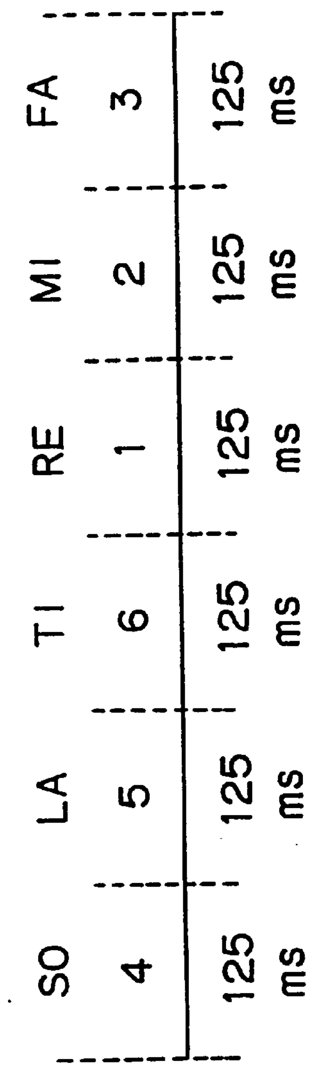
FIG 2B shows specific musical note data included in a message code group which is included in the paging signal of FIG. 2A.

FIG. 2A shows the format of the paging signal received from the base station and consisting of the address code group and message code group. As shown, in the illustrative embodiment, the message code group consists of message data to be displayed on the LCD 7 and musical note data representative of alert tones. FIG. 3 shows a specific message conversion table stored in the controller 3. The musical note data are each transformed to the respective alert tone having a particular melody frequency on the basis of the conversion table. The resulting alert tone pattern is output via the speaker 8. As shown in FIG. 2A, specific note data are made up of data or symbol “<” indicative of the beginning of a melody, data or symbol “>” indicative of the end of the melody, and consecutive data “4”, “5”, “6”, “1”, “2” and “3” sandwiched between “<” and “>”. Musical notes “sol”, “la”, “ti”, “re”, “mi” and “fa” corresponding to the consecutive data “4” through “3”, respectively, are each generated for 125 milliseconds. As a result, alert tones are output via the speaker 8 in a pattern shown in FIG. 2B.

Figure 4:
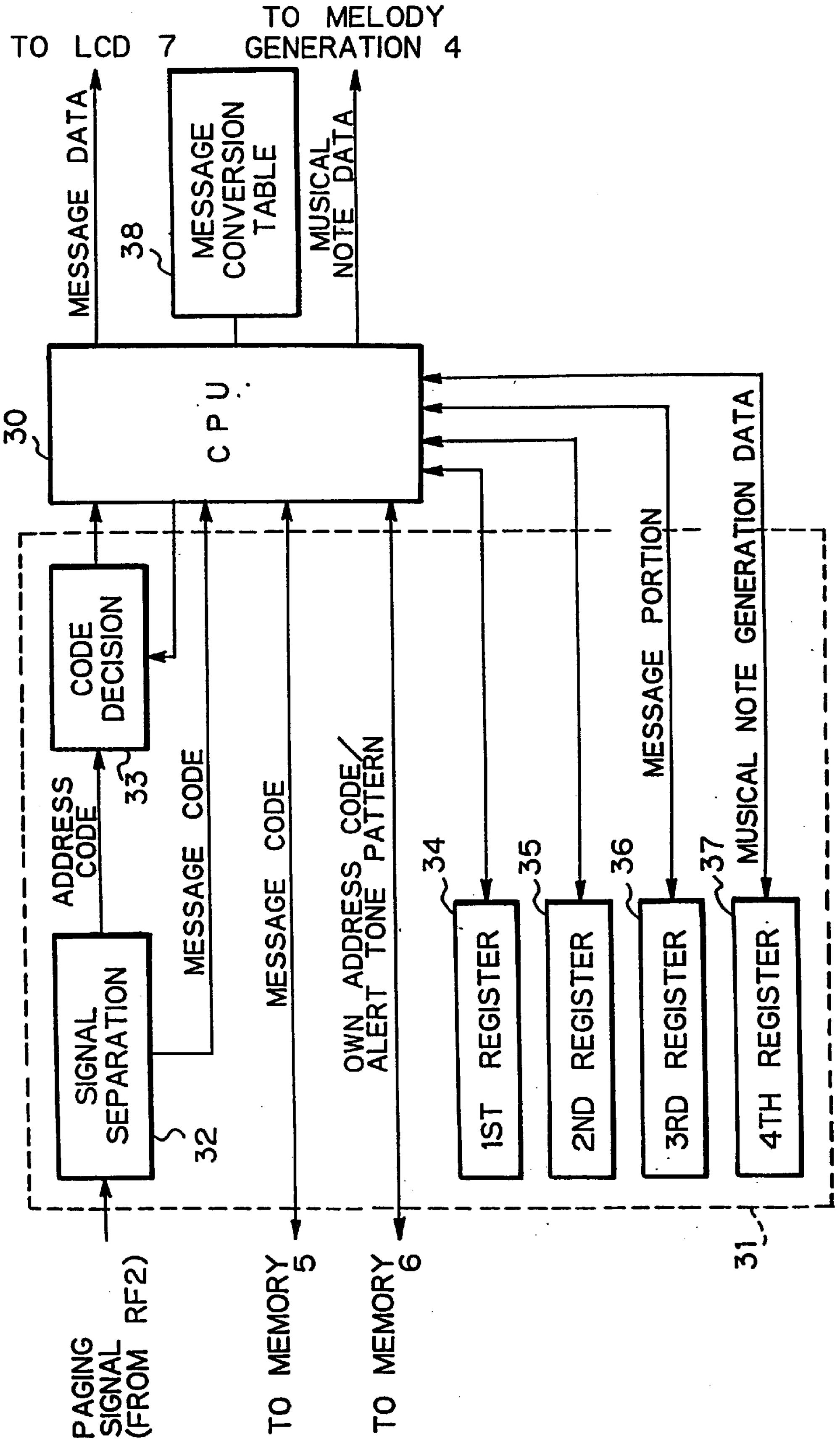
FIG. 4 is a block diagram schematically showing a specific configuration of a controller also included in the embodiment.

FIG. 4 shows a specific configuration of the controller 3. As shown, the controller 3 has a CPU (Central Processing Unit) 30 for executing receipt processing for receiving the paging signal and processing for confirming the message and following the receipt processing. A signal separation 32 separates the paging signal input from the RF section 2 into the address code group and message code group. A decision 33 compares the address code group output from the signal separation 32 and the address code stored in the second memory 6 in order to see if they compare equal. A first register 34 is used to set whether or not the alert tones should be output. A second register 35 is used to set whether or not the musical note data should be written to the first memory 5. A third register 36 is used to store the message data. A fourth register 37 is used to store the musical note data. A message conversion table 38 stores melody frequencies and musical notes corresponding to the musical note data to be received. The signal separation 32, code decision 33 and registers 34–37 constitute a decoder 31 in combination.

Figure 5:
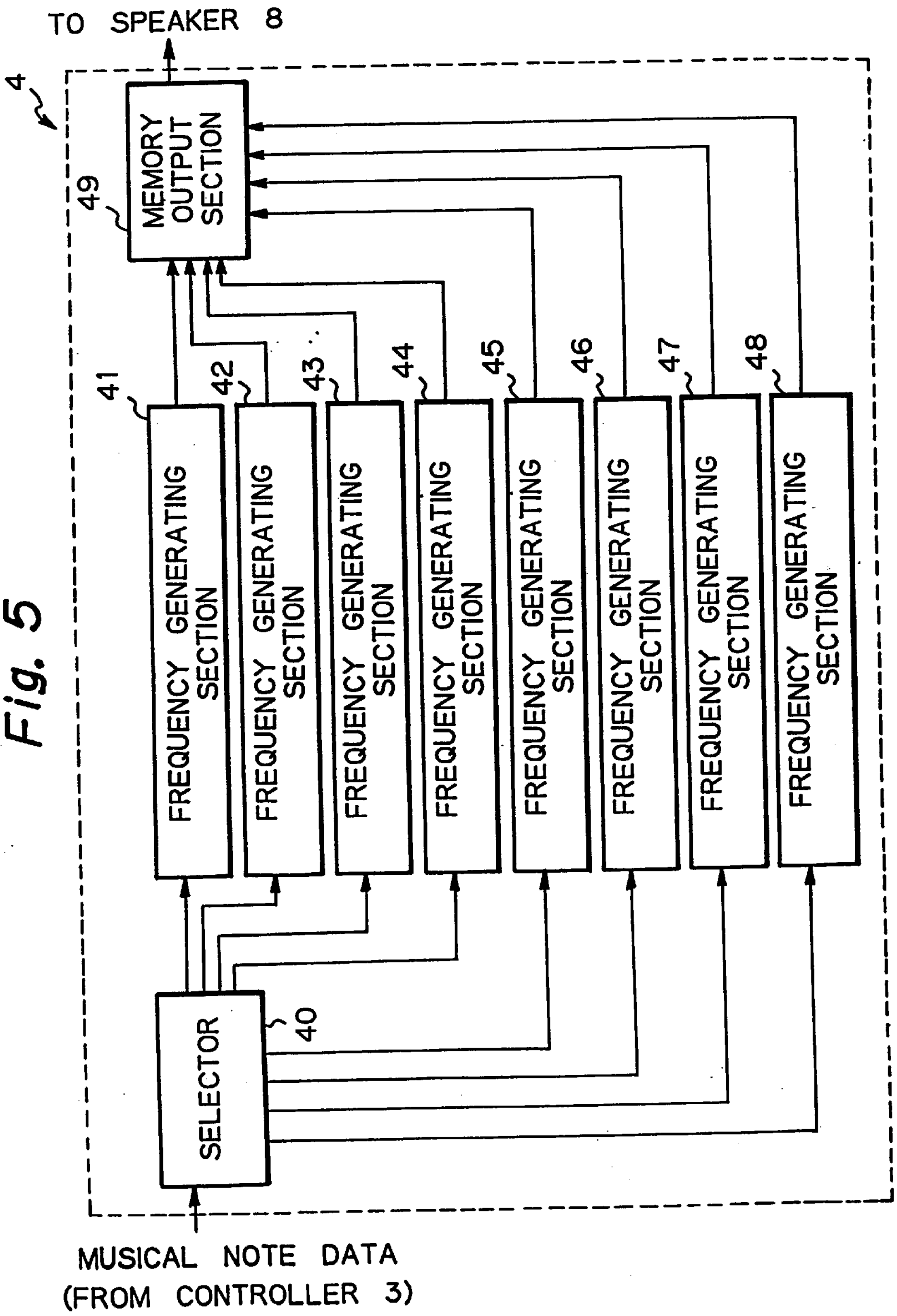
FIG. 5 is a block diagram showing a specific configuration of a melody generating section further included in the embodiment.

FIG. 5 shows a specific construction of the melody generation 4. As shown, the melody generation 4 includes eight frequency generating sections 41–48 each for generating a particular melody frequency corresponding to one of the musical note data to be received. A selector 40 selects one of the frequency generating sections 41–48 at a time in accordance with the musical note data included in the message code group. A melody output section 49 assembles the melody frequencies sequentially output from the frequency generating sections 41–48, thereby producing a melody. The melody is delivered to the speaker 8.

Figure 6A:
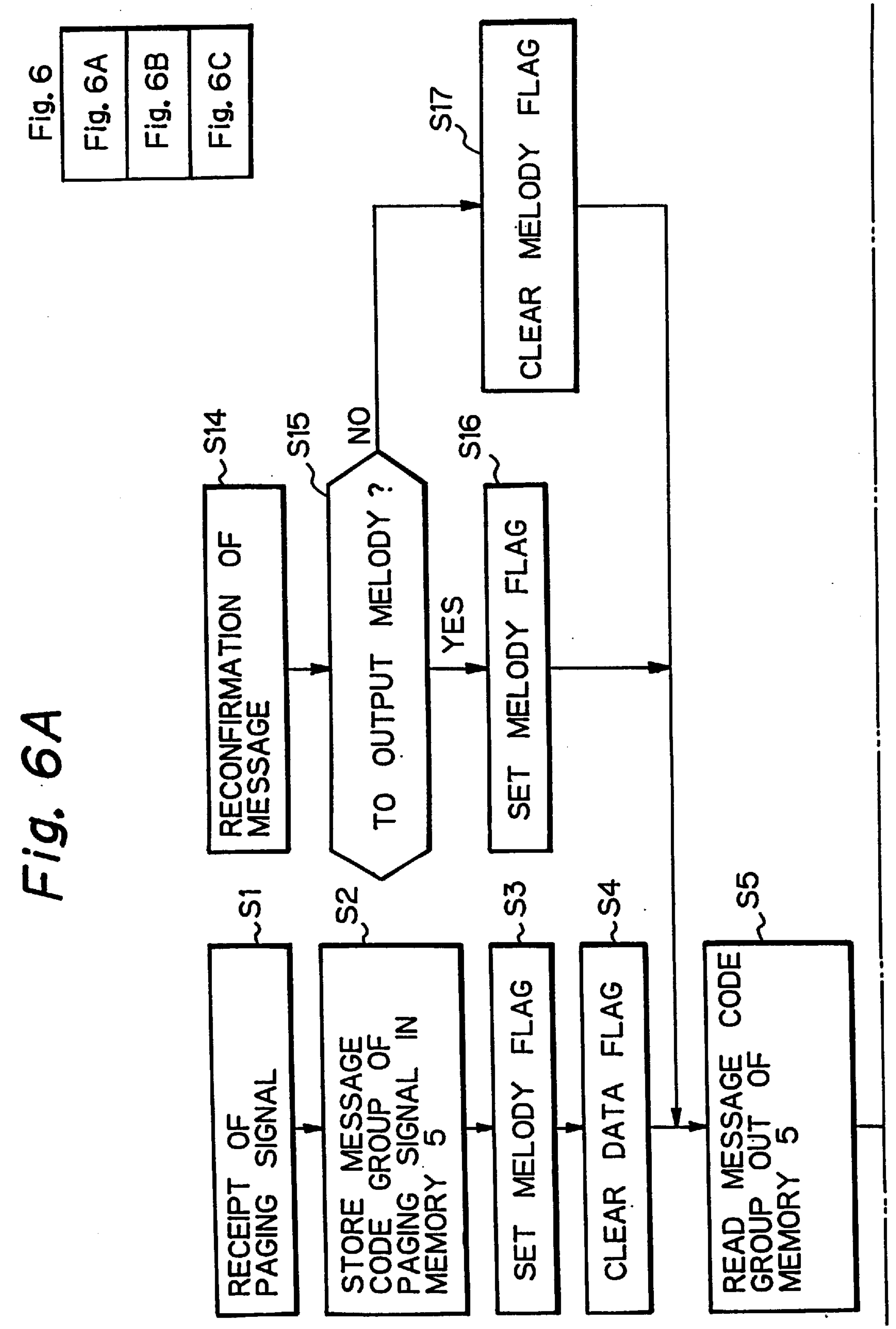
FIGS. 6A–6C show a flowchart demonstrating a specific operation of the controller of the embodiment.
Figure 6B:
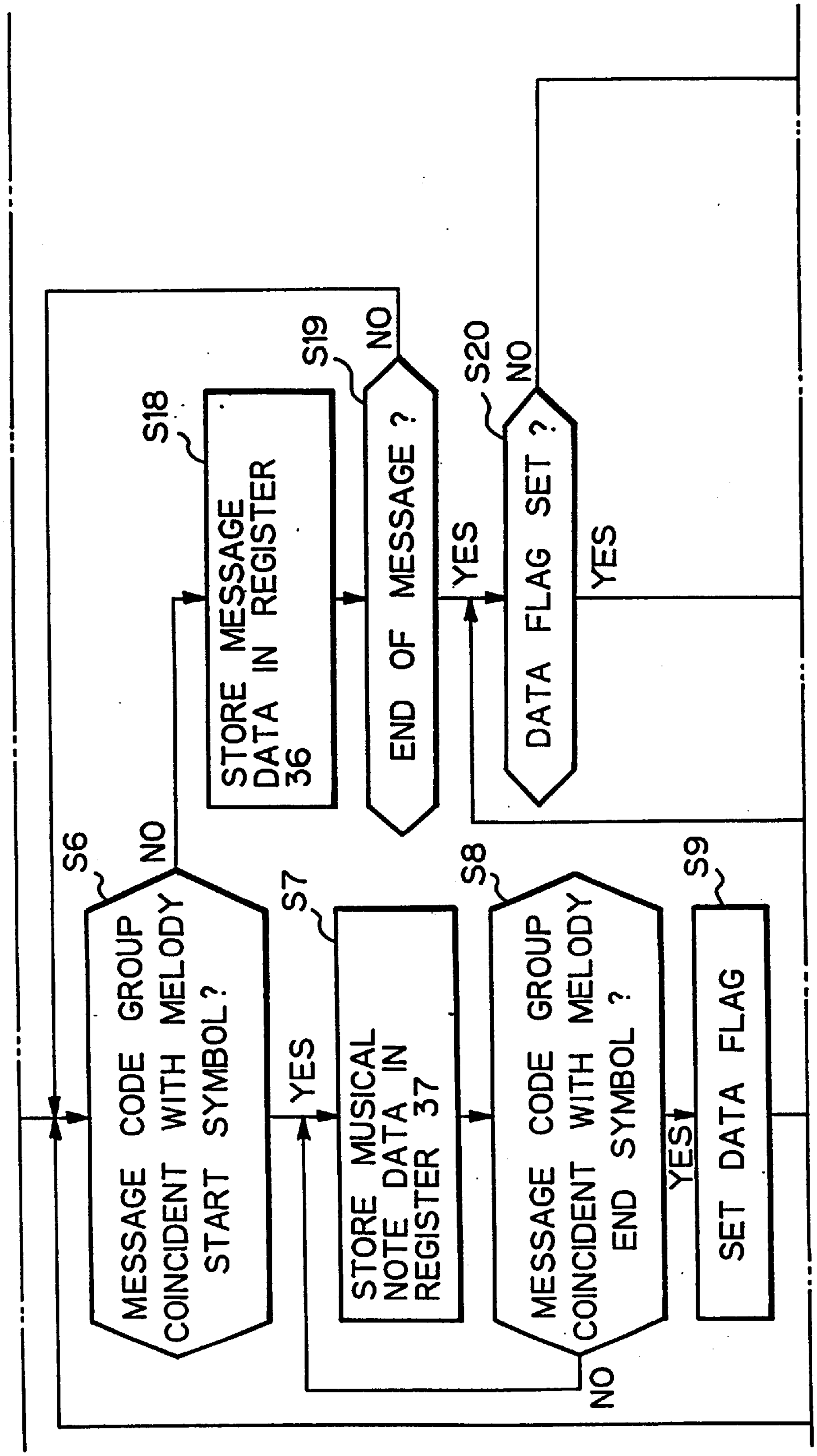
Figure 6C:
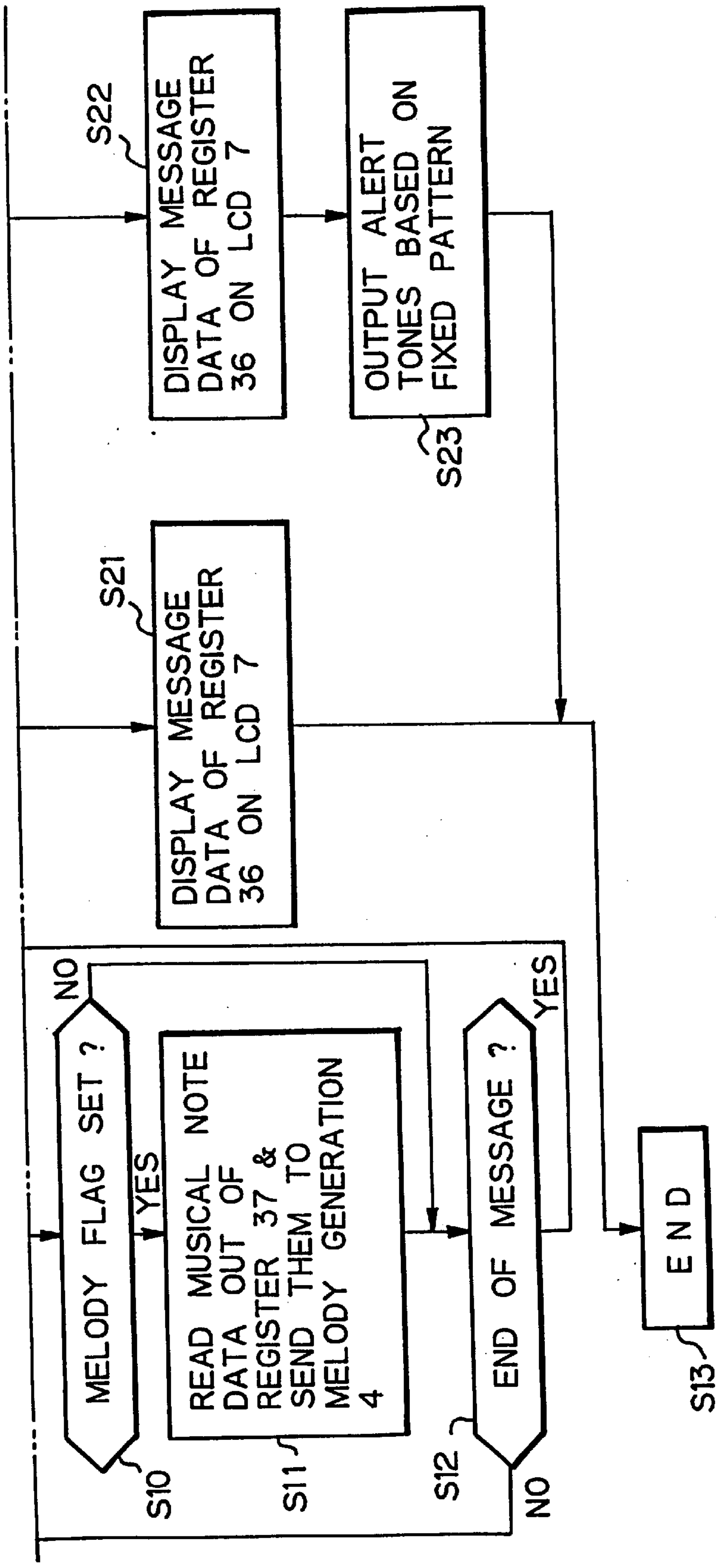

The operation of the pager, particularly the receipt processing of the controller 3, will be described with reference to FIG. 6. The paging signal received from a base station, not shown, is fed to the controller 3 via the RF section 2 (step S1). In the controller 3, the signal separation 32 separates the paging signal into an address code group and a message code group with a preselected method. The address code group and message code group are applied to the code decision 33 and CPU 30, respectively. The CPU 30 temporarily writes the input message code group in the first memory 5 (step 32). On receiving the message code group, the CPU 30 sets a melody flag indicative of whether or not a melody should be output, and stores it in the first register 34, indicating that a melody should be output (step S3). At the same time, the CPU 30 clears a data flag indicative of whether or not the musical note data included in the message code group should be written to the first memory 5, and stores it in the second register 35, indicating that the message code group should be written to the memory 5.

The CPU 30 reads the message code group out of the first memory 5 (step S5). Then, to separate the message data and musical note data shown in FIG. 2A the CPU 30 compares the leading data to the trailing data of the message code group with the melody start symbol “<” one by one (step S6). As to the leading data “0” which is different from the symbol “<” the CPU 30 determines that it is message data, and writes it in the third register 36. The CPU 30 also determines that the second data “1” is different from the symbol “<”, and writes it in the register 36 (step S18). The CPU 30 repeats the above procedure with the third data and successive data until it finds data coincident with “<”. As a result, message data “0, 1, 2, 3, 4” are sequentially written to the register 36. On the other band, on detecting the symbol “<” (step S6), the CPU 30 sequentially writes the musical note data “4” through “3” following it in the fourth register 37 (step S7). Consequently, the note data “4, 5, 6, 1, 2, 3” are stored in the register 37.

Subsequently, when data included in the message code group coincides with the melody end symbol “>” (YES, step S8), the CPU 30 sets the data flag and stores it in the second register 35, showing the presence of the musical note data in the fourth register 37, i.e., the inhibition of the writing of any other data (step S9). Then, the CPU 30 references the melody flag stored in the first register 34 (step S10). The CPU 30 determines whether or not the message has ended (step S12). If the answer of the step S12 is negative (NO), the CPU 30 returns to the step S6 in order to repeat the comparison of the message code group and symbol “<”. If the answer of the step S12 is YES, the CPU 30 reads the message data out of the third register 36 and references the data flag stored in the second register 35 (step S20).

When the message code group includes the symbols “<” and “>”, i.e., the scale indication data, the CPU 30 sets the data flag and stores it in the second register 35 in the step S9, as stated above. It is therefore possible to distinguish, in the step S20, the message of a message code group including the symbols “<” and “>”, i.e., the musical note data and the message of a message code group not including them. Therefore, if the melody flag has been set and stored in the first register 34 (step S10) and if the data flag has been set and stored in the second register 35, then the CPU 30 causes the message data read out of the third register 36 to appear on the LCD 7 (step S21). At the same time, the CPU 30 causes the alert tones based on the musical note data output from the melody generation 4 to be produced from the speaker 8. Then, the CPU 30 ends the receipt processing (step S13).

If the message flag has been cleared and set in the first register 34 and if the data flag has been set and stored in the second register 35, then the CPU 30 does not drive the speaker 8 while allowing the message data read out of the third register 36 to appear on the LCD 7. Assume that the message code group consists only of message data as distinguished from musical note indication data. Then, the CPU 30 clears the data flag in the step S9. As a result, the message data read out of the third register 36 appear on the LCD 7 (step S22) while the speaker 8 produces the single fixed alert toner pattern stored in the second memory 6 (step S23).

The frequency generating sections 41 shown in FIG. 5 generates a melody frequency of 1037.7 kHz corresponding to the musical note data “0” shown in FIG. 3. Likewise, the other frequency generating sections 42–48 respectively generate melody frequencies of 1163.6 kHz, 1280.0 kHz, . . . , 2077.0 kHz. The selector 40 selects one of the frequency generating sections 41–48 at a time in accordance with the note data read out of the second register 35. As a result, the consecutive note data “4, 5, 6, 1, 2, 3” output from the fourth register 37 are respectively fed to the frequency generating sections 45, 46, 47, 41, 42 and 43. In response, the frequency generating sections 45, 46, 47, 41, 42 and 43 sequentially deliver their output melody frequencies to the melody output section 49. The melody output section 49 modulates the consecutive input melody frequencies to output notes corresponding to “sol”, “la”, “ti”, “do”, “re”, “mi” and “fa”, while driving the speaker 8 therewith.

Generally, a message appearing on the LCD 6 automatically disappears on the elapse of a preselected period of time. The user of the pager often desires to reconfirm a message represented by the received paging signal, but disappeared from the LCD 6. This can be done by the following procedure. The user enters a message reconfirmation command on the pager in a preselected manner, e.g., presses a "message call" switch (step S14). Then, the CPU 30 determines whether or not a melody should be output together with the display of a message (step S15). Whether or not to output a melody is set by the user beforehand or every time the user desires to reconfirm a message, as the case may be.

If a melody should be output (YES, step S15), the CPU 30 sets the melody flag and stores it in the first register 34 (step S16). If the answer of the step S15 is NO, the CPU 30 clears the melody flag (step S17) and again executes the step S5 and successive steps. Specifically, the CPU 30 reads a message code group out of the first memory 5 (step S5), separates it into message data and musical note data on the basis of the symbol "<" (step S6), writes the message data in the third register 36 (step S18), and writes the note data in the fourth register 37 (step S7). On detecting the symbol ">" (YES, step S8), the CPU 30 sets the data flag and stores it in the second register (step S9), and then references the melody flag (step S10).

If the CPU 30 has set the melody flag in the step S16, then it also sets it and stores it in the first register 34 in the step S10. In this condition, the CPU 30 sequentially reads the leading musical note data to the tailing musical note data out of the fourth register 37 while delivering them to the melody generation 4 (step S11). If the CPU 30 has cleared the melody flag in the step S17, then it also clears the melody flag in the step S10. In this case, the CPU 30 executes the step S12 after the step S10, skipping the step S11.

Subsequently, if the message has ended (YES, step S12), then the CPU 30 reads the message data out of the third register 36 and references the data flag stored in the second register 35 (step S20). If the answer of the step S20 is YES, the CPU 30 causes the message to appear on the LCD 7 (step S21). As a result, if the melody flag has been set as determined in the step S10, the message appears on the display (step S21) while the speaker 8 outputs the alert tone pattern generated by the melody generation 4. However, if the melody flag has been cleared as determined in the step S10, the message appears on the LCD 7, but the speaker 80 remains silent.

Again, when the message code group does not include musical note data, message data included in the message code group appear on the LCD 7 (step S22) while the speaker 8 sounds based on the fixed alert tone pattern stored in the second memory 6.

In summary, in accordance with the present invention, a radio pager receives from a base station a paging signal consisting of an address code group and a message code group including musical note data. The receiver separates the received paging signal into the address code group and message code group. Further, the receiver separates the message code group into message data and musical note data by using a melody start symbol and a melody end symbol. Then, the receiver generates melody frequencies corresponding to the consecutive musical note data, modulates the melody frequencies to output a melody, and drives a speaker therewith. With this configuration, the pager is capable of outputting alert tones not only in a conventional single fixed pattern, but also in other desired patterns. In addition, the pager is low cost because it does not need a memory for storing a plurality of different alert tone patterns.

Various modifications will become possible for those skilled in the art after receiving the teachings of the present disclosure without departing from the scope thereof.

What is claimed is:

1. A radio pager for receiving from a base station a paging signal including an address code group and a message code group, said message code group including message data and musical note data, and displaying, upon a coincidence of an address code of said address code group with an address code assigned to said radio pager, a message on an LCD while causing a speaker to sound an alert tone, said radio pager comprising:

a controller which separates the paging signal into the address code group and the message code group, and separates the message code group into the message data and the musical note data; and a melody generator which generates said alert tone in response to said coincidence, said alert tone corresponding to, and reproducing at least a portion of the musical note data separated by said controller from the message code group;

a said controller further comprising a message conversion table for storing a plurality of first frequencies, each corresponding to a respective musical note data, and a plurality of first musical notes, said first musical notes respectively corresponding to said plurality of said first frequencies.

2. The radio pager as claimed in claim 1, wherein the musical note data are interposed between a melody start symbol and a melody end symbol.

3. The radio pager as claimed in claim 2, wherein said controller separates the message code group into the message data and the musical note data by sequentially searching the message code group for the melody start symbol and the melody end symbol.

4. The radio pager as claimed in claim 1, wherein said alert tone is the musical note data separated by said controller.

5. The radio pager as claimed in claim 1, wherein said controller displays the message data on the LCD, designates a plurality of second frequencies and a plurality of second musical notes corresponding to the musical note data by looking up said message conversion table, and informs said melody generator of said second frequencies and said second musical notes.

6. The radio pager as claimed in claim 5, wherein said melody generator generates a plurality of third frequencies corresponding to the second frequencies and the second musical notes received from said controller, modulates said third frequencies to output a corresponding melody, and drives said speaker to output said melody.

7. A radio pager for receiving from a base station a paging signal including an address code group and a message code group, said message code group including message data and musical note data, and displaying, upon a coincidence of an address code of said address code group with an address code assigned to said radio pager, a message on an LCD while causing a speaker to sound an alert tone, said radio pager comprising:

a controller which separates the paging signal into the address code group and the message code group, and separates the message code group into the message data and the musical note data;

a first memory for storing the message code group; and a melody generator which generates said alert tone in response to said coincidence, said alert tone corresponding to, and reproducing at least a portion of the musical note data separated by said control means from the message code group;

wherein the musical note data are interposed between a melody start symbol and a melody end symbol; and said controller further comprises:

a signal separating section for separating the paging signal into the address code group and the message code group;

a code decision section for comparing the address code group with an address code assigned to said radio pager, and outputting coincidence information if said address code group is coincident with said address code;

a first register for storing a melody flag showing whether or not said alert tone corresponding to the musical note data should be output;

a second register for storing a data flag showing whether or not the musical note data should be stored;

a third register for storing the message data;

a fourth register for storing the musical note data;

a message conversion table storing a plurality of first frequencies each corresponding to a respective musical note data, and a plurality of first musical notes, said first musical notes respectively corresponding to said plurality of said first frequencies; and a CPU for:

writing, on receiving said coincidence information from said code decision section, the message code group in a first memory while setting said melody flag to show that said alert tone corresponding to the musical note data should be output, reading, after clearing said data flag to show that the musical note data should be stored, said message code group out of said first memory, sequentially comparing leading data to trailing data of said message code group with the melody start symbol, determining, if data of said message code group is different from said melody start symbol that said data is the message data and storing said data in said third register, sequentially comparing, if data of said message code group is identical with said melody start symbol, leading data to trailing data of said message code group following said melody start symbol with the melody end symbol, sequentially writing said message code group in said fourth register as said musical note data until data of said message code group coincides with said melody end symbol, setting said data flag to show that musical note data should not be written, reading, if said melody flag has been set, said musical note data out of said fourth register while delivering said musical note data to said melody generating section, reading said message data out of said third register while displaying said message data on said LCD, determining, if none of said message code group read out of said first memory is coincident with said melody start symbol, that said message code group does not include the musical note data, and displaying said message data on said LCD while driving said speaker with a single fixed alert tone pattern stored in said radio pager beforehand.

8. The radio pager as claimed in claim 7, wherein said alert tone is the musical note data separated by said controller.

9. The radio pager as claimed in claim 7, wherein said controller displays the message data on the LCD, designates a plurality of second frequencies and a plurality of second musical notes corresponding to the musical note data by looking up said message conversion table, and informs said melody generator of said second frequencies and said second musical notes.

10. The radio pager as claimed in claim 9 wherein said melody generator generates a plurality of third frequencies corresponding to the second frequencies and the second musical notes received from said controller, modulates said third frequencies to output a corresponding melody, and drives said speaker to output said melody.

11. A radio pager for receiving from a base station a paging signal including an address code group and a message code group, said message code group including message data and musical note data, and displaying, upon a coincidence of an address code of said address code group with an address code assigned to said radio pager, a message on an LCD while causing a speaker to sound an alert tone, said radio pager comprising:

a controller which separates the paging signal into the address code group and the message code group, and separates the message code group into the message data and the musical note data;

a first memory for storing the message code group; and a melody generator which generates said alert tone in response to said coincidence, said alert tone corresponding to, and reproducing at least a portion of the musical note data separated by said control means from the message code group;

wherein the musical note data are interposed between a melody start symbol and a melody end symbol; and said controller further comprises:

a signal separating section for separating the paging signal into the address code group and the message code group;

a code decision section for comparing the address code group with an address code assigned to said radio pager, and outputting coincidence information if said address code group is coincident with said address code;

a first register for storing a melody flag showing whether or not said alert tone corresponding to the musical note data should be output;

a second register for storing a data flag showing whether or not the musical note data should be stored;

a third register for storing the message data;

a fourth register for storing the musical note data;

a message conversion table storing a plurality of first frequencies each corresponding to a respective musical note data, and a plurality of first musical notes, said first musical notes respectively corresponding to said plurality of said first frequencies;

a switch accessible for setting, when the message is to be reconfirmed after receipt of the paging signal, whether or not said alert tone corresponding to the musical note data should be output; and a CPU for:

setting, when said switch is operated to show that said alert tone corresponding to the musical note data should be output, a memory flag and storing said memory flag in said first register, clearing, when said switch is operated to show that said alert tone co responding to the musical note data should not be output, said memory flag and storing said memory flag in said first register, reading the message code group out of said first memory, sequentially comparing leading data to trailing data of said message code group with the melody start symbol, determining, if data of said message code group is different from said melody start symbol, that said data is the message data and storing said data in said third register, sequentially comparing, if data of said message code group is identical with said melody start symbol, leading data to trailing data of said message code group following said melody start symbol with the melody end symbol, sequentially writing said message code group in said fourth register as said musical note data until data of said message code group coincides with said melody end symbol, setting said data flag to show that musical note data should not be written, reading, if said melody flag has been set, said musical note data out of said fourth register while delivering said musical note data to said melody generating section, reading, when said melody flag has been cleared, said message data out of said third register while displaying said message data on said LCD, determining, if none of said message code group read out of said first memory is coincident with said melody start symbol, that said message code group does not include the musical note data, and displaying said message data on said LCD for reconfirmation while driving said speaker with a single fixed alert tone pattern stored in said radio pager beforehand.

12. The radio pager as claimed in claim 11, wherein said controller displays the message data on the LCD, designates a plurality of second frequencies and a plurality of second musical notes corresponding to the musical note data by looking up said message conversion table, and informs said melody generator of said second frequencies and said second musical notes.

13. The radio pager as claimed in claim 12 wherein said melody generator generates a plurality of third frequencies corresponding to the second frequencies and the second musical notes received from said controller, modulates said third frequencies to output a corresponding melody, and drives said speaker to output said melody.

14. The radio pager as claimed in claim 11, wherein said alert tone is the musical note data separated by said controller.

* * * * *